Sept. 18, 1928.
C. W. ROBERTS, JR
1,684,745
ADJUSTABLE LOCKING DEVICE FOR VALVES AND THE LIKE
Filed Feb. 4, 1926
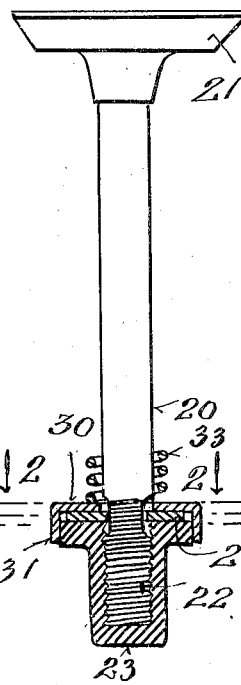
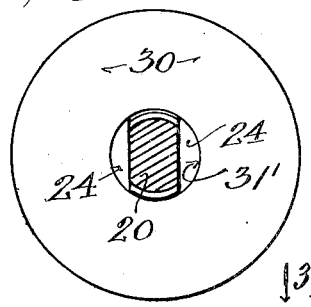
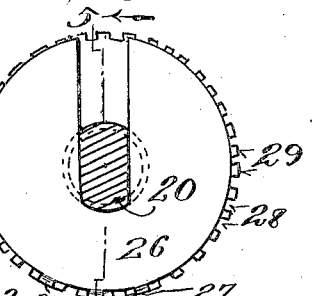
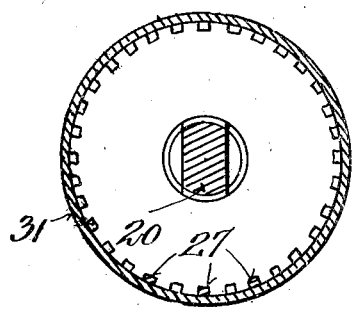
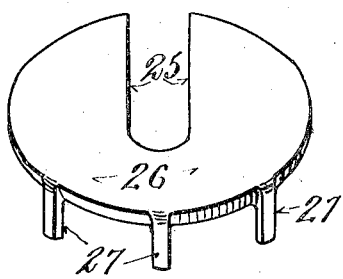
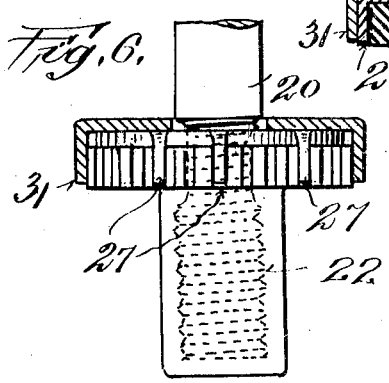
Inventor
Charles W. Roberts Jr
By his Attorneys
Darby & Darby Patented Sept. 18, 1928.

1,684,745

UNITED STATES PATENT OFFICE.

CHARLES W. ROBERTS, JR., OF NYACK, NEW YORK.

ADJUSTABLE LOCKING DEVICE FOR VALVES AND THE LIKE.

Application filed February 4, 1926. Serial No. 85,883.

This invention relates to means for adjusting reciprocating valves in combination with means for locking said adjusting means.

A further object of my invention includes the provision of a lock device of the kind named, which is simple and rugged in construction, efficient and positive in operation, and capable of definite and accurate adjustment. The construction is, moreover, adapted for all leading standard types of valves for internal combustion engines.

Other objects will appear hereinafter, and I attain these objects by the construction illustrated in the accompanying drawing, in which Fig. 1 is a view in elevation of a valve, partly in section, and showing the application of my invention.

Fig. 2 is a view taken on the line 2—2 of Fig. 1.

Fig. 3 is a view taken on the line 3—3 of Fig. 1, with the locking cap omitted.

Fig. 4 is a view taken on the line 4—4 of Fig. 1, looking in the direction of the arrows.

Fig. 5 is a view taken on the line 5—5 of Fig. 3 and through the cap in assembled position.

Fig. 6 is a view of my device with a portion of the cap removed to show the lock pins.

Fig. 7 is a view in perspective of the lock washer, and

Fig. 8 shows a modified form employing a lock cap equipped with securing fingers or clips.

Like numerals refer to similar parts throughout the several views.

The prime object of my invention resides in means for adjusting the length of reciprocating valve stems so as to allow for wear, and at all times quickly adjust and seat the valves, and then to securely lock the adjusting device in the proper position. To this end, I have devised my improved construction herein described and illustrated in the accompanying drawing. I have shown my invention applied to the stem 20 of a reciprocating valve, having the usual valve head 21, and terminating on the opposite end in a screw threaded portion 22. On this threaded portion fits the adjusting holding thimble 23, which, when screwed fully down, reaches onto and partly covers the flattened holding part 24 of the stem 20. It will be noted that the slot 25 of the lock washer 26 fits and engages the holding part of the valve stem 20, and this washer is then held against rotation. The washer 26 is also provided with prongs or pins 27, which fit into notches 28 and engage the teeth 29 of the holding thimble 23 to thus hold the same in the proper adjusted position. The lock washer 26 is securely held by cap 30, which is provided with a central bore 31' to freely move up or down on the stem 20, so that the outer rim 31 engages and covers the teeth 29 and lock washer 26 to thus hold the prongs 27 in the notches 28 of thimble 23. The securing cap 30 may be held in place by any suitable means, as for example, the spring 33 on the valve stem 20, the lower portion only of which spring is shown, may be utilized for this purpose, or I may provide several spaced spring clips 34 on the cap rim 31, which snap over the teeth 29, and hold the cap in place.

From the description thus far given, the purpose and operation of my device are plain. After the proper adjustment of the thimble has been made, the washer 26 is slipped into position, so that the prongs 27 engage in certain of the notches 28 to hold the thimble in position by reason of the flattened seats or holding parts 24 on the stem 20. It will be noted that these parts permit considerable longitudinal adjustment, and so allow for considerable take up in the valve. When the adjustment has been made, and the lock washer put into position, the cap 30 is pushed down, and in the form of cap shown in Figure 8, the clips are permitted to snap in place, to thus securely and safely hold the parts assembled. By my improved construction, a proper adjustment can be easily made and the holding parts are securely locked in position. The device is, moreover, simple and easily applied.

While I have shown and described a specific embodiment of my invention, it is apparent that various modifications falling wholly within the spirit and scope of my invention will suggest themselves to those versed in the art. I do not, therefore, desire to be understood as limiting myself by the specific disclosures, except as stated in the attached claims.

What I claim, therefore, as new and useful, of my own invention, and desire to secure by United States Letters Patent, is:

1. In an adjustable locking device for valve stems, a thimble for the stem having holding notches, a locking member adapted to engage said holding notches and to non-rotatably engage said stem and cap means for holding said parts in locked relation.

2. In an adjustable locking device for valve stems, a thimble adapted to have a screw threaded connection with the valve stem, teeth on said thimble, means adapted to have non-rotatable engagement with said stem and to engage said teeth to hold the thimble in adjusted position and cap means for keeping assembled the thimble and holding means.

3. In an adjustable locking device for valve stems, a thimble adapted to have a screw threaded connection with the valve stem, teeth on said thimble, teeth engaging holding means adapted to slidably and non-rotatably engage the valve stem for holding the thimble against rotation on the stem and cap means for enclosing said holding means to hold together said holding means and thimble.

4. An adjustable locking device for a valve comprising an adjusting member adapted to be mounted on the valve stem, a lock washer adapted to have non-rotatable engagement with said stem and having means for engaging said adjusting member to hold it in adjusted position and a cap for covering said washer and holding it in position with the adjusting member.

5. An adjustable locking device for a valve having a stem comprising an adjusting member having a threaded portion for threadedly engaging the stem and carrying teeth, locking means for engaging the teeth on said adjusting member and non-rotatably engaging the stem, and enclosing means for enclosing said adjusting member having projections for engaging said adjusting member to hold the locking means in adjusted positions.

6. An adjustable locking device comprising an adjusting member having a threaded portion for threadedly engaging a valve stem and carrying teeth, teeth engaging means for non-rotatable engagement with said stem, and a cap to hold locked the teeth engaging means and the adjusting member and enclosing said teeth engaging means.

7. A valve stem having a threaded end and depressed seats, an adjusting member carried on the threaded end, a washer having a slot the sides of which engage said seats, prongs on said washer to lock the adjusting member in adjusted positions on said stem and means for enclosing said washer to hold the washer and adjusting member assembled.

In testimony whereof I have hereunto set my hand on this 13th day of January, A. D. 1926.

CHARLES W. ROBERTS, Jr.